Oct. 4, 1960 R. H. WHEELOCK 2,954,945
HELICOPTER AIRCRAFT CONTROL
Filed Feb. 25, 1957 4 Sheets-Sheet 4

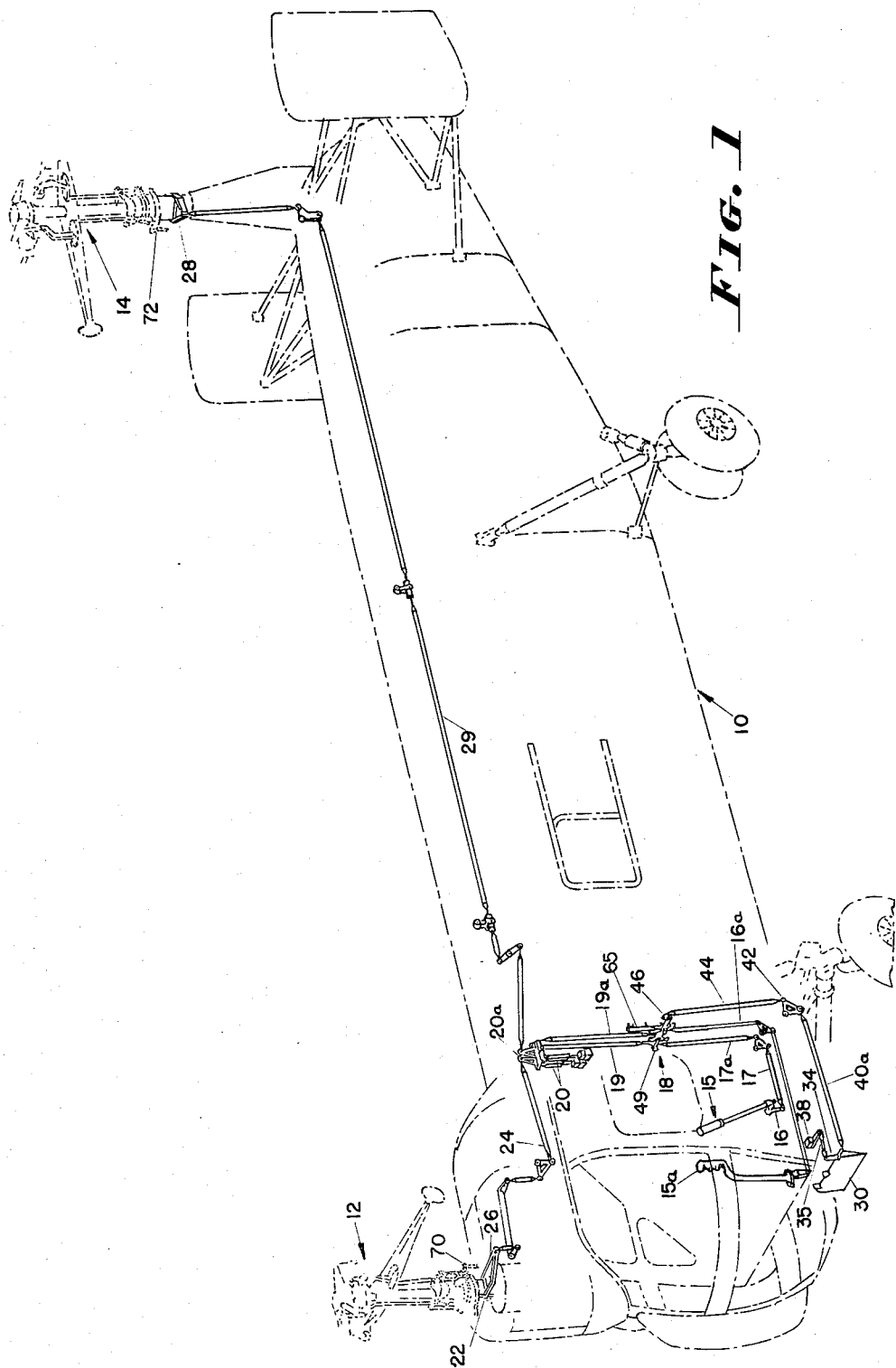

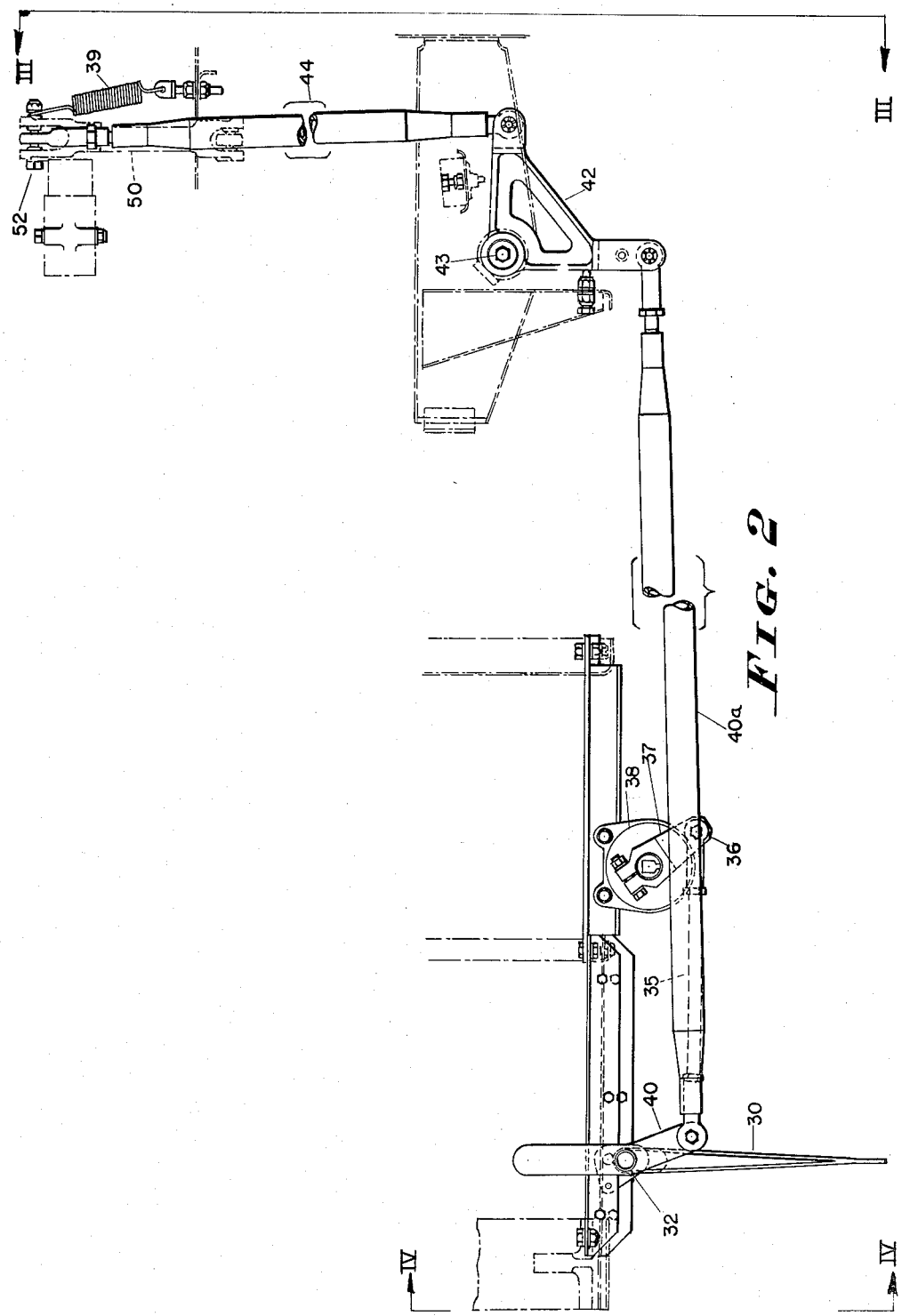

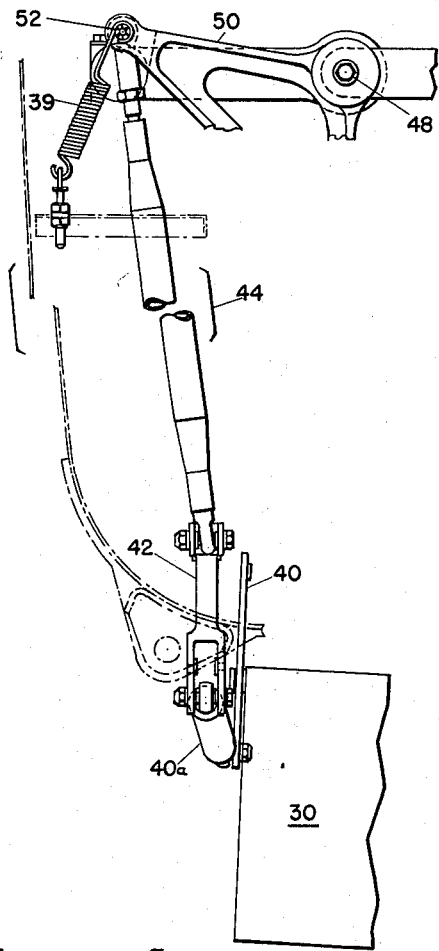
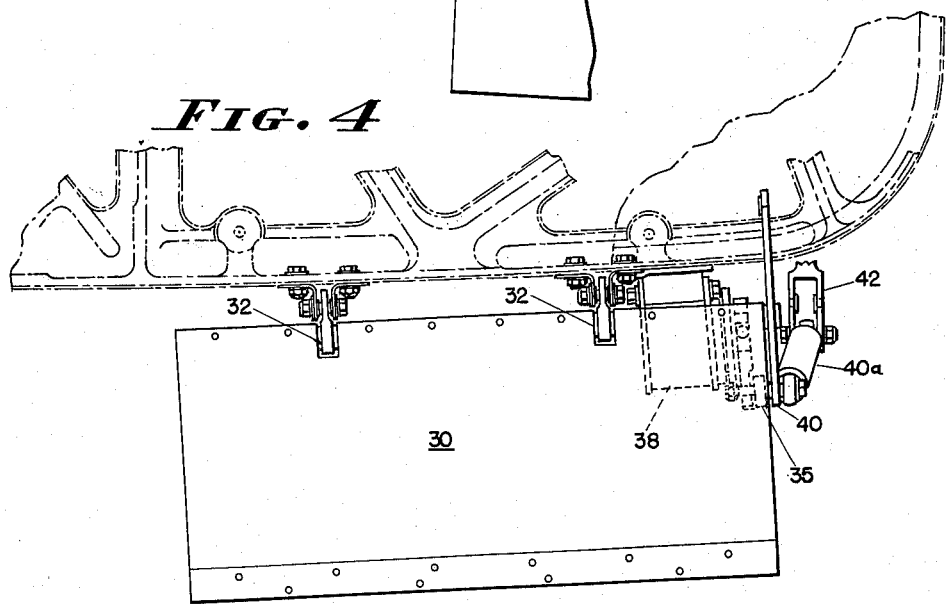

INVENTOR.
ROBERT H. WHEELOCK
BY
Bean, Brooks, Buckley + Bean

United States Patent Office 2,954,945
Patented Oct. 4, 1960

2,954,945
HELICOPTER AIRCRAFT CONTROL

Robert H. Wheelock, Fort Worth, Tex., assignor to Bell Aircraft Corporation, Wheatfield, N.Y.

Filed Feb. 25, 1957, Ser. No. 641,921
2 Claims. (Cl. 244—17.13)

This invention relates to helicopter aircraft, and more particularly to flight control systems in tandem rotor type helicopters.

It is a primary object of the present invention to provide in a helicopter of the type aforesaid, an automatically operable mechanism causing an increase in positive pitching moment on the aircraft fuselage as a function of increased forward air speed.

Another object of the invention is to provide in a helicopter as aforesaid automatically operable means resulting in positive control stick fixed stability, i.e., positive cyclic control stick gradient.

Another object of the invention is to provide in a helicopter as aforesaid means automatically operable to cause the aircraft fuselage to remain in a substantially level attitude throughout various forward air speed change maneuvers.

Other objects of the invention will appear in the specification hereinafter.

In the drawing Fig. 1 is a phantom perspective view of a tandem rotor helicopter embodying an arrangement of the present invention;

Fig. 2 is a side elevational view, on enlarged scale, of a detail of the control arrangement of Fig. 1;

Fig. 3 is a fragmentary rear view elevation of the mechanism of Fig. 2, taken along line 3—3 of Fig. 2;

Fig. 4 is a fragmentary front end elevational view of the mechanism of Fig. 2, taken along line 4—4 of Fig. 2;

Figures 5, 6:
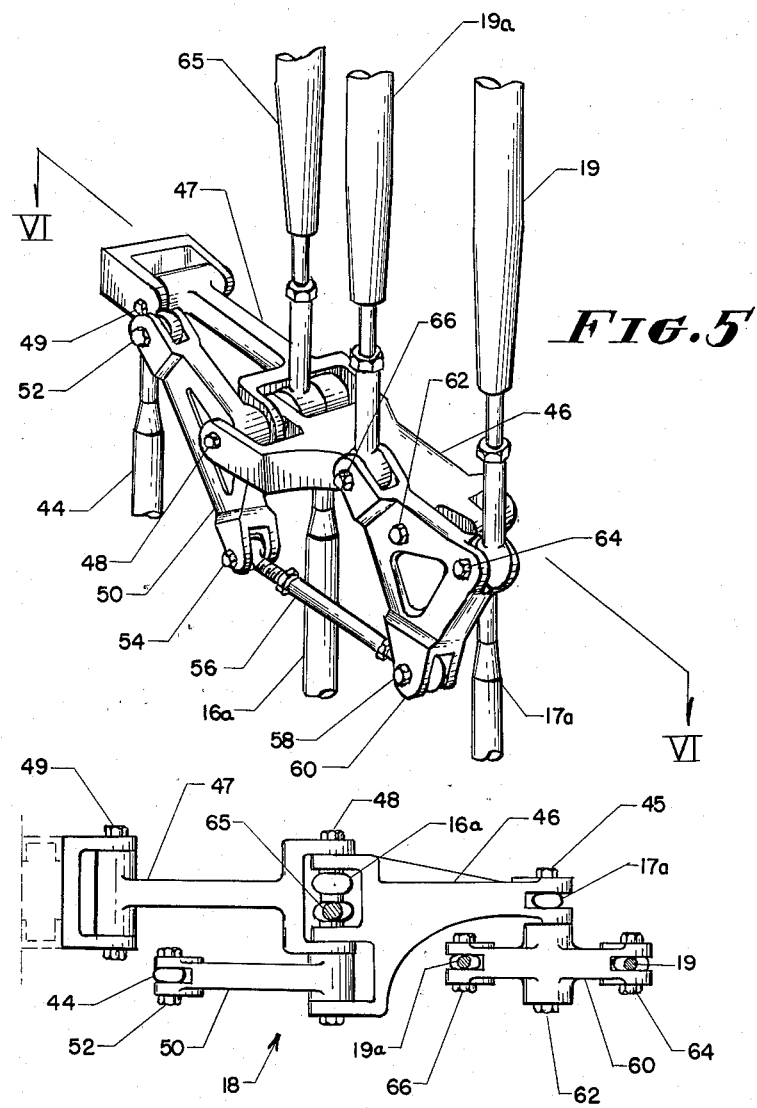
Fig. 5 is a perspective view of a detail of the mechanism illustrated.
Fig. 6 is a fragmentary sectional view taken along line VI—VI of Fig. 5.

As shown in the drawing herewith, the invention may be embodied in a helicopter aircraft comprising generally a fuselage 10 having a front end rotor mast 12 and an aft end rotor mast 14. It will of course be appreciated that the aircraft may be of any desired configuration so as to include appropriate power plant and power transmission and pilot-controlled mechanisms for adjusting the fore and aft rotor blades both collectively and cyclically for maneuvering control of the craft, as is well known in the art. However, with a view to simplification of the drawing herewith only the "collective" pilot-control system for the rotors is illustrated herein; the pilot-control stick for the collective control system being indicated at 15.

The rotor blade collective pitch control system may of course be of any suitable form, but as illustrated herein the control stick 15 is mounted in the fuselage to be rockable back and forth upon a bearing 16 so as to thereby actuate a push-pull rod and bell crank system 17—17a including a mixing lever mechanism 18 actuating a pair of push-pull rods 19—19a operable to actuate the valves of a pair of hydraulic boost cylinders 20—20 which in turn control motions of bell cranks 20a—20a. The collective control 22 of the front rotor 12 is arranged to be alternatively lifted and lowered in response to oscillations of one of the bell cranks 20a through the medium of a push-pull rod and bell crank system 24. Likewise, the collective pitch change control frame 28 of the rear rotor 14 is arranged to be alternately lifted and lowered in response to oscillations of the other of the bell cranks 20a through means of a push-pull and bell crank system 29. Thus, it will be appreciated that pilot manipulation of the control stick 15 will result in appropriate collective pitch change actuations of the levers 22, 28 at the fore and aft rotor systems for corresponding maneuvering control of the aircraft. The bell crank mechanism 20 may be used as a "differential" type whereby collective pitch change actuations of the levers occur to different degrees and direction in response to pilot manipulation of the cyclic control stick 15a; the arrangement and performance of the differential unit 20 being established in accord with the requirements of any given aircraft design.

The mechanism of the invention may be provided as shown in the drawing herewith to comprise an air pressure responsive vane or panel 30 pivotally mounted upon the aircraft fuselage as indicated for example at 32, 32, and thereby disposed as to project externally of the fuselage into the relative air stream in a plane normal to the direction thereof. A control horn 40 extends from the vane 30 into pivotal connection with a push-pull rod 35 leading in turn to a pivotal connection at 36 with the crank arm 37 of a viscous damper 38 which operates to damp oscillations induced by gusts, or the like. A spring 39 is so organized and arranged as to impose upon the system connected to the vane 30 a restraining force competent to hold the vane against swinging motion responsive to air stream forces until such time as a predetermined forward speed has been reached. Thus, it will be appreciated that incidental to forward flight operations of the aircraft, upon attainment of a predetermined forward air speed the vane 30 will commence to swing rearwardly upon its pivot axis, and that the degree of swing will be proportional to the air speed.

Movements of the vane 30 responsive to air speed pressure forces are arranged to be transmitted to the rotor differential collective pitch control system. Thus, for example as illustrated in the drawing, a control horn 40 extends from the vane axle to a push-pull rod 40a which in turn connects to a bell crank 42 pivotally mounted on the fuselage as indicated at 43 (Fig. 2). The bell crank 42 connects at its opposite end to a vertically extending push-pull rod 44 the upper end of which pivotally connects as indicated at 52 (Figs. 2, 3, and 6) to a transversely positioned bell crank 50. The crank 50 in turn is pivotally mounted on an arm or link 47 as indicated at 48. The arm 47 is pivotally supported upon the airframe as indicated at 49. The pivotal connection 48 also mounts a link 46 to one end of which is pivotally connected at 62 the upper end of the push-pull rod system 17a. The bell crank 50 pivotally connects at its other end 54 to a push-pull rod or link 56 leading to pivotal connection at 58 with another bell crank 60. The bell crank 60 is fulcrumed as indicated at 62 on the link 46, in alinement with the pivotal connection 45. One arm of the bell crank 60 pivotally connects at 64 to the bottom end of a push-pull rod 19; while the other end of the bell crank 60 pivotally connects at 66 to the lower end of push-pull rod 19a.

The cyclic control stick of the system is illustrated at 15a (Fig. 1) and connects by means of a push-pull mechanism 16a to the link 46 on the pivot connection 48 (Fig. 6). The push-pull rod 65 extends into connection with the cyclic control swash plates of both rotor systems; the cyclic control system plate of rotor 12 being indicated at 70, and the cyclic control system plate of rotor 14 being indicated at 72 (Fig. 1).

Thus it will be appreciated that swinging motions of the vane 30 in response to varying air pressure forces thereon as a function of forward air speed, will be automatically reflected in corresponding actuations of the bell crank mechanism 18 whereby the collective pitch change mechanisms of the fore and aft rotors will be affected; the mechanism being so arranged that as the forward air speed increases and the vane 30 moves rearwardly, the forward rotor 12 is given an increased collective pitch adjustment relative to the pitch adjustment of the aft rotor, thereby tending to provide a positive pitching (or nose up) moment. This system operates to provide a positive cyclic stick gradient and tends to maintain the craft on an even keel, automatically, throughout all forward speed conditions.

It should be appreciated that in the embodiment illustrated, rod 19a connects to the aft rotor 14 and rod 19 connects to the forward rotor 12. Upward movement of these rods causes a decrease in the collective pitch of each rotor, and downward movement causes an increase in the collective pitch of each rotor. Upward movement of rod 17a causes both rods 19 and 19a to move upward. Upward movement of rod 44 causes the rod 19a to move upward and the rod 19 to move downward. Upward movement of rod 16a causes rod 19 to move upward and rod 19a to move downward.

In other words, when the vane moves control system 48 opposite motions will be transmitted into the push-pull members 19—19a, whereas when the pilot moves the collective control stick 15 members 19—19a are thereby moved in the same directions to equal degree. When the pilot moves the cyclic control stick 15a the mechanism causes the mixing lever system 18 to operate in such manner as to cause the members 19—19a to move in opposite directions. For example, movement of the cyclic control stick 15a forwardly will result in an increase in the forward air speed (due to the operation of the differential control of the collective control system). This increased airspeed causes the vane 30 to move to nullify part of the differential collective input effect, because bell crank 50 is thereby rocked back to nullify part of the pilot input. If the pilot then wants more forward speed he pushes the cyclic control stick further forwardly. This provides a positive cyclic stick gradient. In order to get increased speed of flight it is necessary for the pilot to push the control stick further forwardly. It will of course be appreciated that the collective pitch control stick 15 operates only to provide equal collective pitch adjustments of both rotor systems, and is employed, for example, in control hovering maneuvers. Collective differential pitch adjustments of the rotor systems are obtained by pilot adjustments of the cyclic control stick 15a, and automatically as explained hereinabove by virtue of the operation of the vane 30. Hence, it will be understood that the vane 30 operates only to impose upon the collective pitch system a differential effect.

I claim:

1. In a tandem rotor helicopter aircraft, a fuselage, a plurality of lift rotors supported by said fuselage in longitudinally spaced relationship thereto, each of said rotors having blade pitch change means for collectively changing the pitch of each blade of each of said rotors, a forward speed responsive vane carried by the aircraft fuselage in position to cause the relative air stream to impinge thereon and being movable relative to the fuselage throughout various degrees of displacement as a function of the relative air speed, pilot controllable means manually operable to selectively actuate the blade pitch change means of said rotors, and differential linkage means comprising a first triangular bell crank, a first link pivoted at one of its ends to a first end portion of said first triangular bell crank, a second triangular bell crank pivoted at the center of one of its side portions to the other end of said first link, a second link parallel to the first link pivoted at one of its ends to a second end portion of said first triangular bell crank and at its other end to a first end portion of said second triangular bell crank, a third link pivoted at one of its ends in fixed relationship to said fuselage and at its other end to the first end portion of said first triangular bell crank, a first output pivoted to a second end portion of said second triangular bell crank and being connected to the pitch change means of a forwardly disposed rotor, a second output pivoted to a third end portion of said second triangular bell crank and being connected to the pitch change means of a rearwardly disposed rotor, a first input pivoted to the center of said one side portion of the second triangular bell crank and connected with said pilot controllable means for moving the first and second outputs equally and parallel, a second input pivoted to the third end portion of said first triangular bell crank and connected to said vane for rotating said first bell crank moving said second link and rotating said second bell crank to thereby move the first and second outputs in opposite directions such that in response to increased forward speed of the aircraft the collective blade pitch change mechanism of said forwardly disposed rotor will be adjusted to produce lift increases greater than the coincident lift change forces produced by the corresponding pitch change adjustment of said rearwardly disposed rotor.

2. In a tandem rotor helicopter aircraft, a fuselage, a plurality of lift rotors supported by said fuselage in longitudinally spaced relationship thereto, each of said rotors having blade pitch change means for collectively changing the pitch of each blade of each of said rotors, a forward speed responsive vane carried by the aircraft fuselage in position to cause the relative air stream to impinge thereon and being movable relative to the fuselage throughout various degrees of displacement as a function of the relative air speed, pilot controllable means manually operable to selectively actuate the blade pitch change means of said rotors, and differential linkage means comprising a first triangular bell crank, a first link pivoted at one of its ends to a first end portion of said first triangular bell crank, a second triangular bell crank pivoted at the center of one of its side portions to the other end of said first link, a second link parallel to the first link pivoted at one of its ends to a second end portion of said first triangular bell crank and at its other end to a first end portion of said second triangular bell crank, a third link pivoted at one of its ends in fixed relationship to said fuselage and at its other end to the first end portion of said first triangular bell crank, a first output pivoted to a second end portion of said second triangular bell crank and being connected to the pitch change means of a forwardly disposed rotor, a second output pivoted to a third end portion of said second triangular bell crank and being connected to the pitch change means of a rearwardly disposed rotor, a first input pivoted to the center of said one side portion of the second triangular bell crank and connected with said pilot controllable means for moving the first and second outputs equally and parallel, a second input pivoted to the third end portion of said first triangular bell crank and connected to said vane for rotating said first bell crank moving said second link and rotating said second bell crank to thereby move the first and second outputs in opposite directions such that in response to increased forward speed of the aircraft the collective blade pitch change mechanism of said forwardly disposed rotor will be adjusted to produce lift increases greater than the coincident lift change forces produced by the corresponding pitch change adjustment of said rearwardly disposed rotor, a third output pivoted to the first end portion of said first triangular bell crank, said third output being connected with the pitch change means of each of said rotors, and a third input pivoted to the first end portion of said first triangular bell crank, a second pilot controllable means operatively connected to said third input, said last-mentioned pilot controllable means being manually operable to actuate said third output and displace said first bell crank, moving said second link and rotating said second bell crank to thereby move the first and second outputs in opposite directions.

References Cited in the file of this patent

UNITED STATES PATENTS

| 1,919,089 | Breguet et al. | July 18, 1933 |
| 2,731,215 | Avery | Jan. 17, 1956 |
| 2,743,071 | Kelley | Apr. 24, 1956 |